United States Patent [19]

Dagborn

[11] Patent Number: 4,769,665
[45] Date of Patent: Sep. 6, 1988

[54] ARRANGEMENT FOR SYSTEM CAMERAS

[75] Inventor: Rolf V. Dagborn, Vastra Frolunda, Sweden

[73] Assignee: Victor Hasselbad Aktiebolag, Sweden

[21] Appl. No.: 9,582

[22] Filed: Jan. 29, 1987

Related U.S. Application Data

[63] Continuation of Ser. No. 738,969, May 29, 1985, abandoned, which is a continuation-in-part of Ser. No. 548,331, Nov. 3, 1983, abandoned.

[30] Foreign Application Priority Data

Mar. 10, 1983 [SE] Sweden .............................. 8301292

[51] Int. Cl.$^4$ .............................................. G03B 7/00
[52] U.S. Cl. .................................... 354/412; 354/485; 354/286; 354/288
[58] Field of Search ................... 354/412, 485, 173.1, 354/286, 288, 105, 106

[56] References Cited

U.S. PATENT DOCUMENTS

| | | |
|---|---|---|
| 3,670,639 | 6/1972 | Harnden, Jr. .................... 354/485 |
| 3,812,499 | 5/1974 | Hayashi et al. .................... 354/485 |
| 4,449,805 | 5/1984 | Sakurada et al. .................... 354/105 |
| 4,460,265 | 7/1984 | Mashimo et al. ................. 354/173.1 |
| 4,466,019 | 8/1984 | Sakashita ............................. 354/286 |
| 4,477,164 | 10/1984 | Nakai et al. ........................ 354/286 |
| 4,519,692 | 5/1985 | Michalik ............................. 354/412 |
| 4,560,267 | 12/1985 | Nakai et al. ........................ 354/412 |
| 4,639,112 | 1/1987 | Nakai et al. ........................ 354/286 |

Primary Examiner—Russell E. Adams

[57] ABSTRACT

The present invention relates to an arrangement for system cameras of the kind which have interchangeable component parts which may be attached to a camera body, said component parts communicating electrically with each other and with the camera body. Into this system has been incorporated a data bus which extends partly into the camera body and partly into the other interchangeable parts via contact devices arranged on the connections between the various parts. The different parts of the system are able to communicate with each other and individual component parts can be allocated new functions via the small number of conductors in the data bus circuit without having to alter the contact configuration between the component parts.

4 Claims, 3 Drawing Sheets

ARRANGEMENT FOR SYSTEM CAMERAS

This application is a continuation of application Ser. No. 738,969, filed May 29, 1985, now abandoned, which is a continuation-in-part application of U.S. Ser. No. 548,331 filed Nov. 3, 1983 now abandoned.

The present invention relates to an arrangement for system cameras having interchangeable component parts which may be attached to a camera body, such as a film magazine, a lens and a view finder, said component parts being able to communicate electronically with the camera body.

Technical progress made within the field of electronics means that many types of photographic cameras have been designed with advanced automatic control of, amongst other things, photometry, the setting of the diaphragm to suit the selected shutter speed and vice versa, and automatic film advance by means of a motor. Cameras of this kind are equipped for this purpose with sensors and actuators which operate in conjunction with a central electronic function in order to adjust the camera in such a way as to provide the necessary conditions for a good picture. The most advanced cameras even include a microcomputer.

When the above principle is applied to a system camera which has interchangeable component parts such as the film magazine and the lens, etc., problems will arise in connection with the transmission of signals at the connection point between the component parts. If, for example, the lenses are fitted with electronic sensors for the purpose of providing the central unit with information relating to the selected shutter speed and/or the diaphragm, a number of contact pins will be required on the mounting between the lens and the camera body in order to permit the transmission of information to take place. Camera systems are in existence which exhibit up to a dozen pins for the purpose of providing said transmission.

It is important in this respect that the contact pins should be of very high quality in order to prevent interference with the transmission of the signal due to transition resistance. Furthermore the sensors, which are often of the resistive type, must be manufactured within extremely precise tolerances, not only with regard to their own linearity, but also with regard to the compatibility between different lenses. From the mechanical point of view, increasing difficulty will be encountered in direct proportion to the number of pins present, due to the fact that the lens is often held in position by means of a bayonet mounting, i.e. it must be rotated in order to be mounted.

The manner in which the aforementioned disadvantages and difficulties may be dealt with in system cameras with automatic control is facilitated considerably by the present invention, so that a minimum number of contact pins may be used for the transmission of a large number of different signals, but without the transition resistances, etc., of the contacts being particularly critical. In this respect the present invention is characterized in that the camera system incorporates a digital signal system comprising a number of units, in that the different units are situated in the different parts of the camera system, and in that they communicate with each other via a so-called data bus circuit which extends partly into the camera body and partly into the outer interchangeable component parts fitted with their digital units.

The nature of this design is such that the number of contact pins required is not a multiple function of the number of functions which are to be transmitted, but is such that one and the same group of contact pins may be used for a number of different functions. Furthermore the system is not restricted to those functions for which the present embodiment has been designed, but functions may be allocated to or withdrawn from the different component parts as developments take place in the concept of the camera system.

In one embodiment of the arrangement in accordance with the present invention an external connection is provided, preferably on the camera body, to which a manually adjustable sensor unit may be connected so as to permit data to be fed in instead of data which is not available from, for instance, a film magazine of an older type without a film speed selector.

In another variant of the present invention, simulation devices are present which can be connected into the interfaces between the different component parts of the camera, for example to the lens in place of the camera body, enabling the lens to be operated and tested with regard to its function.

An embodiment of the present invention is described below with reference to the diagrammatic representations contained in the figures in the accompanying drawing.

Figure 1:
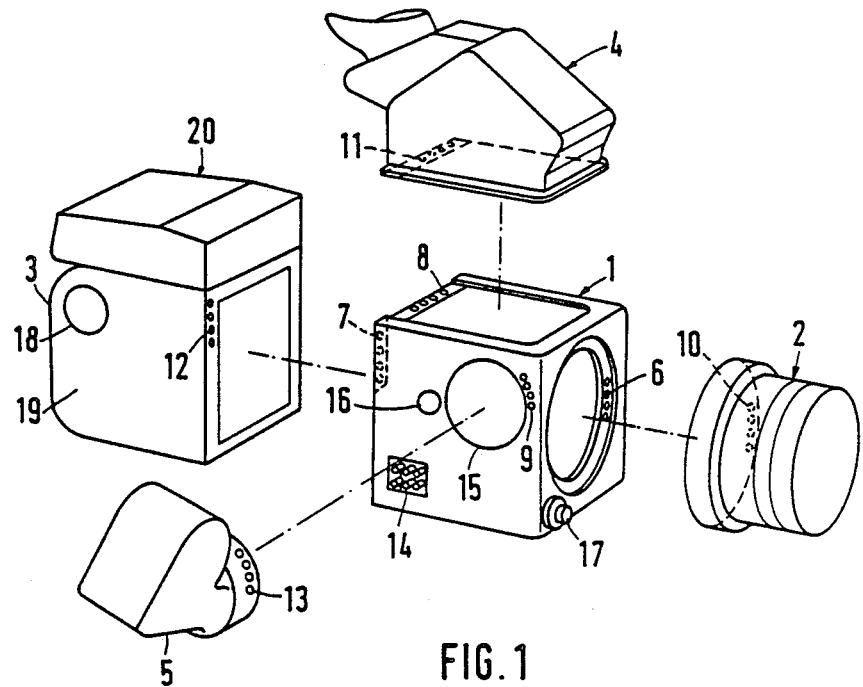
FIG. 1 illustrates examples of different, previously disclosed component parts of a camera system to which the present invention has been applied.

In the example shown in FIG. 1 a camera system in accordance with the present invention comprises a camera body 1, a lens 2, a film magazine 3, a viewfinder 4 and a winder 5. Only a single lens, film magazine and viewfinder are illustrated, although the system naturally includes several variants of these, equipped in a similar fashion.

The camera body 1, which constitutes the common link in the system, is provided at its various attachment surfaces to the other component parts with contact arrangements 6, 7, 8 and 9, each of which exhibits four contact pins in the case illustrated. Each of the remaining component parts of the system is fitted with its own contact devices 10, 11, 12 and 13 corresponding to the contact devices on the camera body.

At one end of the camera body is a recessed contact panel 14. The camera body is also provided with a holder 15 of the type bayonet socket, a button 16 for a carrying strap and a shutter release button 17.

A data bus circuit (shown in FIG. 3) situated in the camera body is connected to all the contact devices 6–9 and 14, and prolongations of the data bus circuit are present in the component parts 2–5 and 21. The digital system of the camera system is connected to the data bus circuit. The digital system consists of a number of units, each of which is connected to the data bus circuit in the respective component part 1–5 and 21 as will be described later on.

The camera body 1 contains the calculation and process control elements of the digital system. It calls up the other units in order to pass on instructions and receives any data provided by them via the data bus circuit. In the lens 2 are digital sensors for the set diaphragm value and a digital code for the maximum possible diaphragm opening, said code naturally varying with the type of lens. In the event of the lens having an integral shutter, sensors are also fitted for the set shutter speed. Between the sensors and the data bus circuit are connected interface circuits which are designed with different addresses. On being called, the interface circuits will transmit the current values on the data bus, so that the processor unit in the camera body will be able to receive them. As an alternative to this system, in which a bus master scans the addresses, it is conceivable for the various interface circuits to have a master function which, in the event of any change in status, will demand priority on the bus circuit and will transmit current information once such priority has been established. This system, known per se, imposes a smaller load on the bus and provides a more rapid system.

In a similar fashion the film magazine contains an interface circuit which senses the set value on the film speed selector 18 and which will, for example, sense whether the unexposed film has been advanced into position ready for exposure. Above the actual film magazine body 19 is also fitted a data entry unit 20, with the help of which alphanumeric characters can be entered onto the film. The data entry unit 20 is also connected to the data bus circuit so as to permit external communication enabling changes to be made to the input information.

The viewfinder 4 contains display organs (not illustrated) which are able in a fashion, known per se, to indicate the set time and diaphragm openings, for example, which are obtained via the data bus circuit and the pair of contacts 8, 11. The winder 5 receives via its contact 13 information relating to the time when the motor is to start up in order to cause the film to advance. This information can also be transmitted directly via the contact pins, although one of the major advantages of the present invention is that each of the component parts 2-5 will permit extension of the data bus, since the camera system can then be built with new functions in the different parts without every contact pin being "occupied" and requiring new pins to be made available. An example of this is provided where the measurement of the incoming light normally takes place inside the camera body, but where it is wished to measure the light at the lens. This does not require any new contact pins to be provided in the connection between the lens and the camera body, but simply requires the connection of a lens with an integral light sensor and the associated interface to the camera body and thus to the data bus, whereupon all that remains is to expand the software in the calculating and processing unit if this has not already been prepared for this purpose so that it will sense it automatically. The flexibility of the system is also demonstrated by the fact that it is possible to attach a viewfinder with an integral light meter and to supply the calculating and processing unit with the necessary data via the data bus without contact problem arising.

Figure 2:
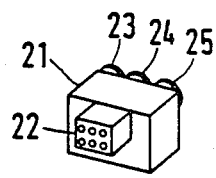
FIG. 2 illustrates an example of an adaptor for the manual input of data.

The data bus circuit is externally accessible via the recessed contact panel 14, even when the camera body is connected to all of the component parts 2-5. Into this panel can be inserted an adapter 21 illustrated in FIG. 2, said adapter exhibiting a contact device 22 which fits into the recessed panel 14. The adapter 21 is provided with a maneuvring means 23, 24 and 25. If a magazine 3 which is not fitted with a means for indicating the film speed is used, for example, the adapter may be used in order to feed the value of the film speed into the processor unit via the data bus. This is thereby set by means of one of the maneuvring means 23-25. The other maneuvring means may be designated for the input of, for example, the diaphragm opening of a lens being used temporarily and lacking a sensor for said data, etc.

The data bus system according to the invention is described more in detail in the following with reference to FIGS. 3-7 of the drawings.

Figure 3:
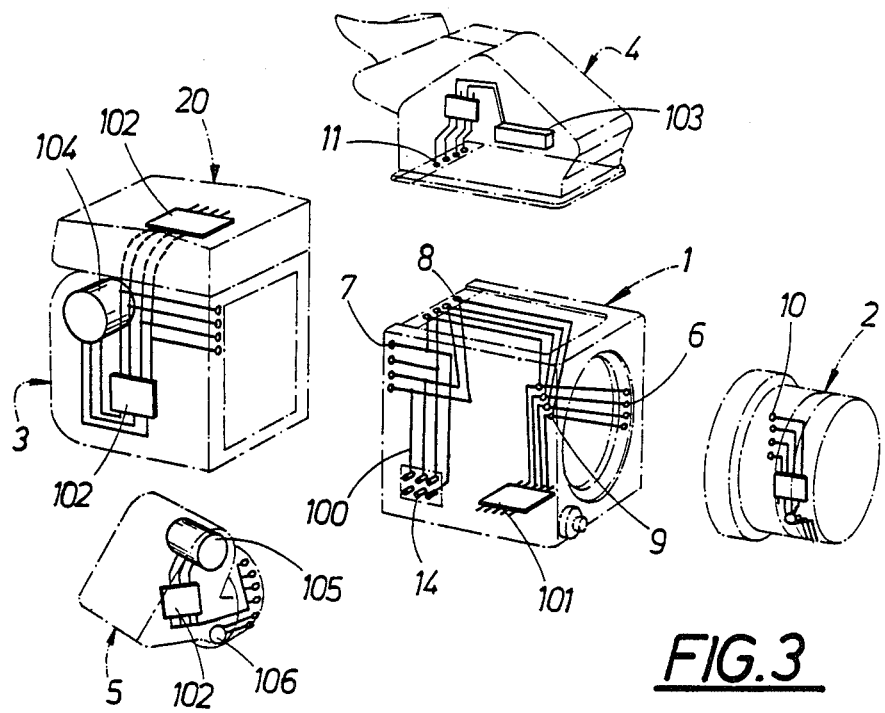
FIG. 3 illustrates the same parts as in FIG. 1, but with a communication system shown.

In FIG. 3 is shown the same units as in FIG. 1, consequently the camera body 1, the lens 2, the film magazine 3, the viewfinder 4, the winder 5 and the data entry unit 20. Contrary to FIG. 1, FIG. 3 does not show said objects as parts of the camera system, but merely as spaces into which the data bus system is situated. As evident from FIG. 3 the data bus system includes a number of electric cables stretching between the electric contacts 6, 7, 8, 9 on the camera body and 10, 11, 12, 13 on the component parts shown in Fig. A. On the camera body is also a contact 14 for the connection of the adapter 21 of FIG. 2, however not shown in FIG. 3.

Said cables, shown as lines 100 in FIG. 3, are connecting the following electric components of the different units with said contacts so that the electric components of each unit can be connected to the components of the camera body. The electric components may be, in the camera body 1 a micro processor 101 for calculating and governing operations; in each unit a micro processor 102 for processing the communication signals via the data bus which function, however in the camera body can be integrated in said micro processor 101 (as shown in FIG. 3); in some units one or more sensors 103 provided to sense light values and other factors of importance for the photographic exposure, in some units sensing means 104 for determining the position of organs as maneuvring organs for the shutter speed, maneuvring organs for the diaphragm, winding organs for the film and so on; and in some units power means as motors 105 for operations as winding of the film and setting of the diaphragm. There is also included an electric battery 106, which is connected to two of the conductors 100. The battery 106 can be situated in the winder 5.

The values sensed by the sensors and the positions indicated by the sensing means and the governing impulses to the power means corresponds to a great number of datas which has to be communicated between the units of the camera system by means of the data bus. If such a number of datas would be transferred by means of conventional electric system a great number of electric conductors were necessary to provide. As evident from FIG. 3 the data bus is only including four conductors 100 in the circuit. It would be possible to have only two conductors, but it would complicate the processing of the signals transferred. Further, the conductors are by side the necessary communication used for supplying said power means with electric power for their operation and to combine the supplying of electric power with the signalling would be still more complicated. Therefore the choosen system means a suitable compromise giving a relatively simple data bus system according to the included communication processors 102 by a few as four conductors in the circuit of the system.

As evident the circuit is formed as a forked system in which all the micro processors 102 of the data bus system are connected to each other and with all of the processors connected to all the four conductors.

As the different datas are not distinquished from each other by means of the way they are transferred as by an conventional electric system they have to be distinguished by their form by means of a coding and decoding performed in the data bus system.

Figure 4:
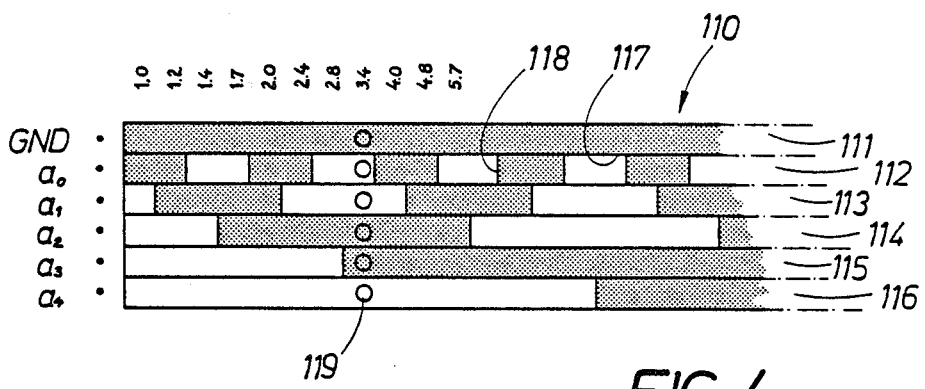
FIG. 4 illustrates a contact ring of one of said parts.
Figure 5:
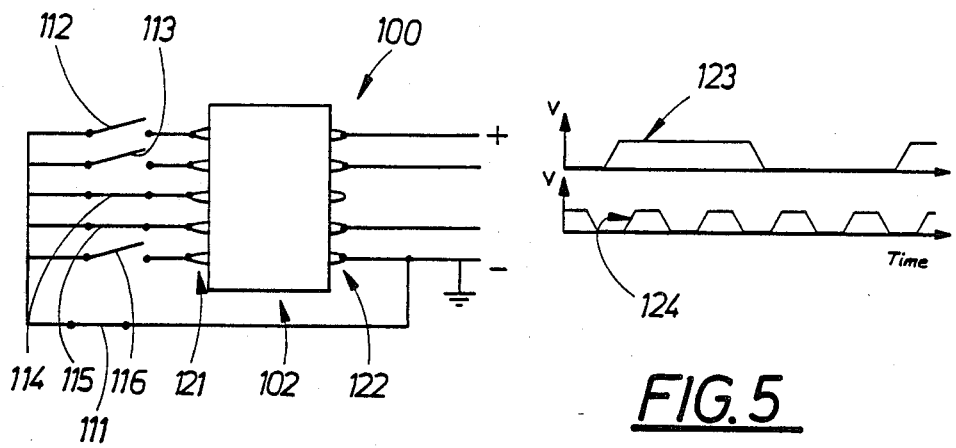
FIG. 5 illustrates a part of the communication system.

How the data bus system functions is shown by way of an example in FIGS. 4 and 5 with reference to the indication of the diaphragm setting position. As known the exposure in the camera has to be adapted to the film speed and to the current light. In this case it is supposed that the diaphragm is set manually. Consequently, the micro processor 101 of the camera body has to calculate the shutter speed on the basis of the diaphragm setting, the film speed and the current light sensed. Thereby the diaphragm setting position has to be sensed and the adequate indication has to be transferred to the micro processor via the data bus.

In FIG. 4 is shown a part of a ring 110 in the diaphragm setting mechanism. The ring part is shown in a plane configuration, but in the mechanism it will be in annular form. It is made of a conductive material and will be turned when the setting mechanism is manoeuvred in order to open or close the diaphragm. The ring forms six pathes of which one indicated as 111 has an unbroken surface and five indicated as 112-116 are broken by means of recesses 117 forming contact parts 118 in between them. The contact parts are of a certain length in the peripherial direction of the ring with the length increasing from the track 112 to 116. As an effect of the different lengths of the contact surfaces 118 their positions in relation to each other will change along the ring. The contact surfaces are screened in FIG. 4.

Transverse to the ring is placed a row of sliding contacts 119. The contacts 119 will each be either in contact with one of the contact surfaces 118 or be positioned in one of the recesses 117 and not in contact with the respective track. However, by the first, unbroken track 111 the respective contact will always be in contact with the same. For the contacts at the row 112-116 the said two conditions will alternate when the ring 110 is turned in order to set the diaphragm. In the position of the contacts 119 shown in FIG. 4 only the contacts at the tracks 114 and 115 are in contact with the ring surface and of course also the contact at the track 111 which always as mentioned is in contact with the ring.

The set condition is by way of circuit diagram shown in FIG. 5 there is also shown the micro processor 102 of the data bus system and situated in the lens unit 2. As indicated are two of the four conductors 100 of the data bus circuit (indication +, −) provided to supply electric power from the battery 106. One of these conductors (−) is connected to the contact ring 110 at its unbroken track 111. As all the tracks are in electric contact with each other by means of the material of the ring also each one of the contacts at the tracks 112-116 can be in contact with said conductor if they are in contact with one of the respective surfaces 118. As it is the case at the tracks 114, 115 there is a closed contact symbol indicated with 114 respectively 115 in FIG. 5 while other contact symbols indicated 112, 113, 116 are shown as open. By the closed contacts the conductor mentioned will be connected to the micro processor 102. As indicated in FIG. 5 the first mentioned conductor (−) is grounded by being connected to the metal frame of the respective parts of the camera system. The other power supply conductor (indicated + in FIG. 5) is as shown connected directly to the micro processor 102.

The other two conductors 100 of the data bus circuit are used for signalling according to the code system processed in the micro processor 102. For such processing can be used for example a micro processor known as Philip's MAB 8400. This micro processor will function in the following way. It senses an electric code in a certain variable pattern which represents the pattern in which the connection pins 121 of the micro processor are grounded by means of the contacts 119 at the tracks 112-116. In accordance with this pattern the micro processor will produce a coded data signal to be transferred via one of the said signalling conductors at the output contact points 122 of the processor. In the remaining signalling conductor is produced a clock signal for syncronizing of communicating micro processors. This signal is preferably produced in the central micro processor 101 in the camera body 1. The data signal and its relation to the clock signal will form a code which is unique for each of the said pattern.

Micro processors of said type are provided to receive a great number of input patterns and also to produce a great number of code signals. Therefore it is possible to use the same type of micro processor in all the units and thereby obtain a unique code signal for each function in the entire camera system. The signals produced is in FIG. 5 shown as time/tension (voltage) diagrams in front of the conductors in questions. The curve 123 thereby represents the clock signal and the curve 124 the code signal. As evident the code pulses between the clock pulses forms a certain configuration according to number and position served ways to design a code suitable for a data communication are known to a person skilled in the art.

The code signal produced is transferred to the central micro processor 101 in the camera body 1 and will be used together with other code signals also transferred by means of the data bus circuit and relating to film speed, which can be set manually or by certain types of film cassettes automatically, and the value of the current light sensed e.g. by the sensor 103. The calculation will result in a value for the shutter speed and the shutter has to be set to this speed before the exposure will be made. This setting can be made manually according to the indication of the correct shutter speed in a display for example positioned in the viewfinder 4. The shutter speed can also be set automatically by means of an electric motor or another kind of power means. As the impulse for the start and the stop of the motor will be in the form of the code signal described the same has to be decoded and electric impulses for the governing of the rotation of the motor has to be produced.

Figure 6:
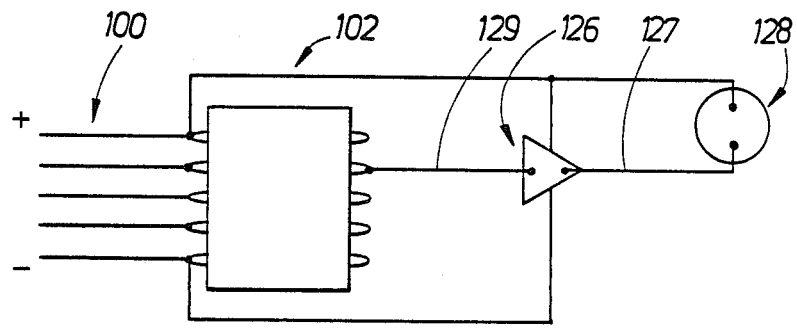
FIG. 6 illustrates another part of the communication system.

For the described purpose the same type of micro processor can be used as is indicated with its reference number 102 in FIG. 6. The conductors of the data bus circuit is as before indicated 100. The two power supply conductors are indicated + − and, as shown connected to the micro processor 102 as well as to a relay 126 connected to the output side of the micro processor and to the two power supply conductors. The relay has also an output line 127 connected to an electric step-motor 128 connected to the shutter for the setting of its speed. The motor is also connected to one of the power, supply conductors. The relay 126 is provided to connect the motor directly with the other power supply conductor when it receive an impulse from the micro processor via a connection 129.

When the micro processor 102 receive the code signal from the central micro processor 101 indicating that a certain shutter speed should be set, the signal is decoded, and in the micro processor is produced a train of pulses the number of which is adapted to the number of steps the shutter has to be set to obtain the predetermined position. This train of pulses is transferred in the line 129 to the relay. The relay will produce a corresponding number of periods during which the motor 128 is connected to the power supply conductors. According to its function as a step-motor it will turn an adequate number of steps and the shutter will be set in the right position.

After this description of the two main functions of the micro processor 102 it will be understood that this micro processor or a similar type may be used for all the functions of the component parts of the camera system. Both for receiving indications of positions or values measured and for maneuvring impulses as described for the setting of the shutter speed or for setting of the diaphragm, for the winding of the film e.g.

As central computer can, as mentioned, a micro processor Philip's MAB 8400 be used. The data bus circuit can be used for all kinds of communication if suitably coded and the calculating and governing functions can alternatively be divided on several micro processors which can be placed in different parts of the camera system. Thereby it is also possible to complete the system with new calculating functions relating to a certain part of the system.

The micro computers provided only for communication and not for calculation purposes as described can also be of the said type. It is, however obvious to the technican, that one or more of the last said microcomputers for communication via the data bus may be instead a dedicated Input/Output IC (e.g. Philip's PCF 8574 for parallel input/output functions, Philip's PCF 8577 for LCD driving purpose etc) in those cases when a limited local calculating power is called for on the chip of the computer.

This is usually the case for applications where signals are merely coded/decoded to data bus format from direct lines or vice versa as is e.g. shown in FIG. 5. In this very application an interface IC type Philip's PCF 8574 might be used instead of a microprocessor.

The system in accordance with the present invention also provides entirely different possibilities from those of conventional camera systems with regard to the testing of the function of its various component parts. It is thus possible, for instance, to test the functions of the lens by making a connection to the data bus at any point in the system, for example at the point where the adapter is connected. It is possible to make a connection via the data bus to control the entire system in an alternative fashion or to "listen" how the system is operating.

The invention is not restricted to the embodiment specified above and illustrated in the accompanying drawing, but a wide range of variations and applications is possible within the context of the following claims. The camera may be connected via the recessed contact panel 14 to a radio receiver or to an IR detector so as to permit the remote control not only of the shutter release but also of the setting of the shutter speed and/or the diaphragm opening for instance. The flashlight may be controlled via a so-called "hot-shoe" in relation to the quantity of light entering the lens. It is also conceivable to attach in place of a film magazine a magazine for the optoelectronic recording of images, whereby the image could be output electronically via the recessed contact panel 14. The various contact devices 6–13 may with advantage be executed in such a way that, in the event of the invention being applied to an existing system, older component parts of the system which are not equipped in accordance with the present invention can be connected mechanically to the camera body without inconvenience. An adapter 21 is best used for this purpose.

In addition to the pins for the data bus and for the power supply, the contacts may also include additional pins for the purpose, for example, of carrying a high current. If a lens is used with spacer rings, these must naturally be equipped with contacts and transcurrent conductors for the data bus.

The positioning of the contacts on the different component parts may be selected so they differ from that illustrated in the embodiment. The contact for the magazine may, for instance, be situated on its lower edge and that of the viewfinder on its front edge.

It is also conceivable for the calculating and controlling element of the digital system to be situated in some part of the camera system other than the camera body, for example in the viewfinder. A multi CPU-system is also permissable.

If the system includes a dedicated flash, this may be fitted with control devices for the control of the parameters such as, for example, a "stand-by" signal, exposure control, diaphragm, choice of guide number and range, etc. The latter should, of course, also be capable of being controlled automatically by sensing the range setting on the lens.

The data entry unit may, of course, be programmed so that it will "pick up" directly from the data bus the value of, for example, the set of diaphragm and shutter speed for the print of this information on the film.

It has been assumed in the above that communication between the different parts of the system will take place in the form of electrical signals. This is not essential, however, to the utilization of the idea of invention. Alternatively, communication may take place optically by means of light impulses along optical conductors such as glass fibre cables. The contact organs in such a case shall be executed in accordance with this, in the form of a connection between the ends of two glass fiber cables and an electrical contact for the power supply to the electrical actuators which may be present in the system. It is also possible within the context of the invention for the arrangement to be executed in the form of an at least partially mechanical system, preferably incorporating the mechanical transmission of power for the operation of certain of the component parts.

I claim:

1. Electric control device in a system camera including a number of units namely a camera body and attachable alternative or completing each other component parts; such as film magazines, film winder means, lenses and view finders, the control device comprising:

sensing means in selected ones of said units for generating sensing electric signals depending on factors such as light, diaphragm setting and shutter speed;
electric driving means in certain ones of said selected units for moving adjustable means such as film winder means, diaphragm setting means and shutter speed setting means;

data bus means, said data bus means including electric wiring means in the selected units, a plurality of electronic processing means, one in each of the selected units, for receiving said sensing signals from the sensing means in the same unit, and for generating an address signal and for producing communication signals each including a signal corresponding to the sensing signals received from the respective sensing means and an address signal designated for the processing means in each unit, interface means provided to connect the wiring means of each unit to an adjacent unit and allow said communication signals to be transferred in the wiring means to said processing means included in the data bus means, calculating and governing functions of the camera system being divided on the plurality of electronic processing means of said data bus means;

electronic process control means in the camera body being provided to receive, via said data bus means, said communications signals and to process the included signals corresponding to the signals of the respective sensing means and to generate actuating signals arrived at as a result of the processing;

a source of electric power for the electric control device;

said electronic process control means further transferring via the data bus means, signals corresponding to said produced actuating signals, the signals on the data bus means being accompanied by address signals selectively designating processing means; and said electric driving means each being connected to one of said electronic processing means included in the data bus means, said respective electronic processing means generating activating signals which correspond to the respective actuating signals produced by the process control means and transferred on the data bus means by means of the respective address signal, said activating signals being transferred to said electric driving means to activate said electric driving means.

2. Electric control device according to claim 1 in which in selected ones of the sensing means include means for registering a certain level of change in a state and activating said processing means of the data bus to produce a communication signal corresponding to the changed signal received from the respective sensing means to be transferred to the electronic process control means.

3. An arrangement in accordance with claim 1, wherein there is provided an input unit having an interface to be connected to the data bus, said unit being capable of manual adjustment so as to enter into the bus signals in place of signals from component parts which lack a sensing means for the production of relevant signals.

4. An arrangement in accordance with claim 1, wherein there is provided simulation devices which can be connected into one or more of the interface means between the component parts, said simulation devices being so arranged as to transmit and receive signals for testing purposes.

* * * * *